US009361341B2

(12) United States Patent
Chen et al.

(10) Patent No.: US 9,361,341 B2
(45) Date of Patent: Jun. 7, 2016

(54) FUNCTIONAL-FORM QUERIES (75) Inventors: Qiming Chen, Cupertino, CA (US);
Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1693 days.

(21) Appl. No.: 12/706,154

(22) Filed: Feb. 16, 2010

(65) Prior Publication Data
US 2011/0202550 A1 Aug. 18, 2011

(51) Int. Cl.
*G06F 17/30* (2006.01)

(52) U.S. Cl.
CPC .... *G06F 17/30489* (2013.01); *G06F 17/30442* (2013.01); *G06F 17/30477* (2013.01); *G06F 17/3046* (2013.01); *G06F 17/30958* (2013.01)

(58) Field of Classification Search
CPC .................. G06F 17/30442; G06F 17/30477; G06F 17/30864; G06F 17/30471; G06F 17/30498; G06F 17/30389; G06F 17/30395; G06F 17/30424; G06F 17/30474; G06F 17/30675; G06F 17/30327; G06F 17/30451
USPC .......... 707/763, 769, 790, 792, 797, 798, 803
See application file for complete search history.

(56) References Cited

U.S. PATENT DOCUMENTS

| | | | | |
|---|---|---|---|---|
| 7,089,266 | B2 * | 8/2006 | Stolte et al. | 707/769 |
| 2004/0015809 | A1 * | 1/2004 | Cheng | 717/100 |
| 2004/0073539 | A1 * | 4/2004 | Dettinger et al. | 707/3 |
| 2004/0117359 | A1 * | 6/2004 | Snodgrass et al. | 707/3 |
| 2004/0243595 | A1 * | 12/2004 | Cui et al. | 707/100 |
| 2007/0250330 | A1 * | 10/2007 | Chen et al. | 705/1 |
| 2008/0177720 | A1 * | 7/2008 | Mordvinov et al. | 707/4 |
| 2009/0024500 | A1 * | 1/2009 | Kay et al. | 705/35 |
| 2009/0112792 | A1 * | 4/2009 | Barsness et al. | 707/2 |
| 2010/0049733 | A1 * | 2/2010 | Hill | 707/102 |

OTHER PUBLICATIONS

U. Dayal et al., "A Transactional Model for Long-Running Activities," Procs. of 17th Int'l Conf on Very Large Data Bases, Barcelona, Spain, Sep. 1991.
A. Novick, "Transact-SQL User-Defined Functions," Chapter 11, pp. 229-245, Wordware Publishing, Inc., ISBN 1-55622-079-0, copyright 2004.
"AquaLogic," Internet web site http://en.wikipedia.org/w/index.php?title=AquaLogic&printable=yes, Dec. 7, 2009.
T. Argyros, "How Aster In-Database MapReduce Takes UDF's to the Next Level," www.asterdata.com/blog/, Aug. 27, 2008.
J. Backus, "Can Programming Be Liberated from the von Neumann Style?", Comms. of the ACM, Aug. 1978.
T. Barclay et al., "TerraServer Bricks," Microsoft Technical Report MSR-TR-2004-107, Oct. 2004.

(Continued)

*Primary Examiner* — Pierre Vital
*Assistant Examiner* — Andalib Lodhi
(74) *Attorney, Agent, or Firm* — Michael A. Dryja (57) ABSTRACT

Middleware is integrated within a database engine. The middleware is to execute a functional-form query representing a dataflow graph comprising queries and relation valued functions. The middleware is to interact with the database engine to cause the database engine to execute the queries. Each relation valued function receives a plurality of first relations as input and generates a second relation as output.

20 Claims, 5 Drawing Sheets

(56) References Cited

OTHER PUBLICATIONS

R. Chaiken et al., "SCOPE: Easy & Efficient Parallel Processing of Massive Data Sets," VLDB '08, Aug. 2008.
Q. Chen et al., "Data-Continuous SQL Process Model," OTM 2008, Part I, LNCS 5331, pp. 175-192, year 2008.
Q. Chen et al., "Correlated Query Process and P2P Execution," Globe 2008, LNCS 5187, pp. 82-92, year 2008.
Q. Chen et al., "Inter-Enterprise Collaborative Business Process Management," HP Technical Report HPL-2000-107, Aug. 17, 2000.
D. Dewitt et al., "Clustera," PVLDB '08, Aug. 2008.
W.O. O'Connell et al., "A Teradata Content-Based Multimedia Object Manager for Massively Parallel Architectures," Procs. of ACM-SIGMOD 1996 Int'l Conf. on Mngmnt of Data, 2006.
C. Ordonez et al., "Vector and Matrix Operations Programmed with UDFs in a Relational DBMS," CIKM '06, Nov. 2006.
M. Jaedicke et al., "User-Defined Table Operators," Procs. of 25th VLDB Conf., 1999.
Y. Cao et al., "Optimizing Complex Queries with Multiple Relation Instances," SIGMOD '08, Jun. 2008.
S. Padmanabhan et al., "Block oriented processing of Relational Database operations in modern Computer Architectures," Procs. of 17th Int'l Conf. on Data Eng'g, 2001.
Greenplum white paper "A Unified Engine for RDBMS and MapReduce," accessed from Internet web site www.greenplum.com on Feb. 15, 2010.
M. Isard et al., "Dryad," EuroSys'07, Mar. 2007.
B.F. Cooper et al., "PNUTS," VLDB '08, Aug. 2008.
Q. Chen et al., "Nested Relation Based Database Knowledge Representation," ACM SIGMOD, year 1991.
C. Olston et al., "Pig Latin," SIGMOD '08, Jun. 2008.
Q. Chen et al., "CPM Revisited," CoopIS/DOA/ODBASE 2002, LNCS 2519, pp. 72-90, year 2002.
M. Zukowski et al., "Cooperative Scans," VLDB '07, Sep. 2007.
Y. Tao et al., "Exploiting Common Subqueries for Complex Query Optimization," Procs. of Conf. of Centre for Advanced Studies on Collaborative Research, year 2002.
Q. Chen et al., "Extend UDF TEchnology for Integrated Analytics," DaWaK 2009, LNCS 5691, pp. 256-270, year 2009.
R.E. Bryant, "Data-Intensive Supercomputing," CMU Tech Report CMU-CS-07-128, May 10, 2007.
Q. Chen et al., "Cooperating SQL Dataflow Processes for In-DB Analytics," OTM 2009, Part I, LNCS 5870, pp. 389-397, year 2009.
P. Roy et al., "Efficient and Extensible Algorithms for Multi Query Optimization," ACM SIGMOD, Jun. 2000.
A. Pavlo et al., "A Comparison of Approaches to Large-Scale Data Analysis," SIGMOD '09, Jun. 29-Jul. 2, 2009.
B. Gedik, "SPADE," SIGMOD '08, Jun. 2008.

* cited by examiner

FIG 1A

PRIOR ART

FUNCTIONAL-FORM QUERIES

BACKGROUND

Large organizations, such as enterprises, typically collect a large amount of data that is stored in one or more databases. To analyze this data, such as to discern trends represented within the data, and so on, application computer programs known as business intelligence application computer programs are used. The application computer programs in general formulate queries that are executed against the databases to return relevant data, which the application computer programs then use for analysis purposes.

DETAILED DESCRIPTION

As noted in the background section above, application computer programs, such as business intelligence application computer programs, formulate queries that are executed against databases to return relevant data, which the application computer programs then use for analysis purposes. These application computer programs logically speaking are external to database engines that run the queries against the database. That is, there is a database engine that executes queries against a database, and there is an application computer program that interfaces with the database engine to provide the queries to the database engine.

This architecture of a database engine and an application computer program separate from and external to the database engine can be problematic from a performance perspective. For example, an application computer program may realize a dataflow process, which is a series of queries in graph form, and thus which is referred to as a dataflow graph. Some of the queries may be duplicated within the dataflow graph. Because the application computer program is external to the database engine, the results of duplicate queries cannot be shared across the dataflow graph within the database engine. Rather, the database engine has to execute each query separately, even if the identical query has already been executed. Such repeated execution of duplicate queries hampers performance of the dataflow graph processing.

Embodiments of the present disclosure overcome this problem by integrating middleware within a database engine. The dataflow graph that would otherwise be processed by an application computer program external to the database engine is instead processed by the middleware. Because the middleware is integrated within the database engine, duplicate queries within the dataflow graph are evaluated just once by the database engine. The results of such duplicate queries are therefore shared across the dataflow graph within the database engine. As a result, duplicate queries are not repeatedly executed, and the performance of dataflow graph processing is improved.

To implement integration of middleware within a database engine for improved performance in processing a dataflow graph, embodiments of the present disclosure employ what is referred to herein as a functional-form query. A functional-form query is a query that includes an expression that declaratively denotes a function based on other functions, which are considered parameters within the expression; this is explained in detail below. The functional-form query represents the dataflow graph, and are a mechanism by which the middleware is able to be integrated within the database engine to improve the performance of dataflow graph processing.

The dataflow graph represented by a functional-form query can include, in graph form, queries as well as what are referred to herein as relation valued functions, to aid in the integration of the middleware within the database engine. A relation valued function is a user-defined function, and returns a relation as output in response to receiving a number of relations as input; this is explained in detail below. The combination of relation valued functions and functional-form queries, the latter which are expressed within a functional-form query framework that is also described in detail below, thus permits the integration of middleware within a database engine in a way that improves the performance of dataflow graph processing.

Figure 1A:
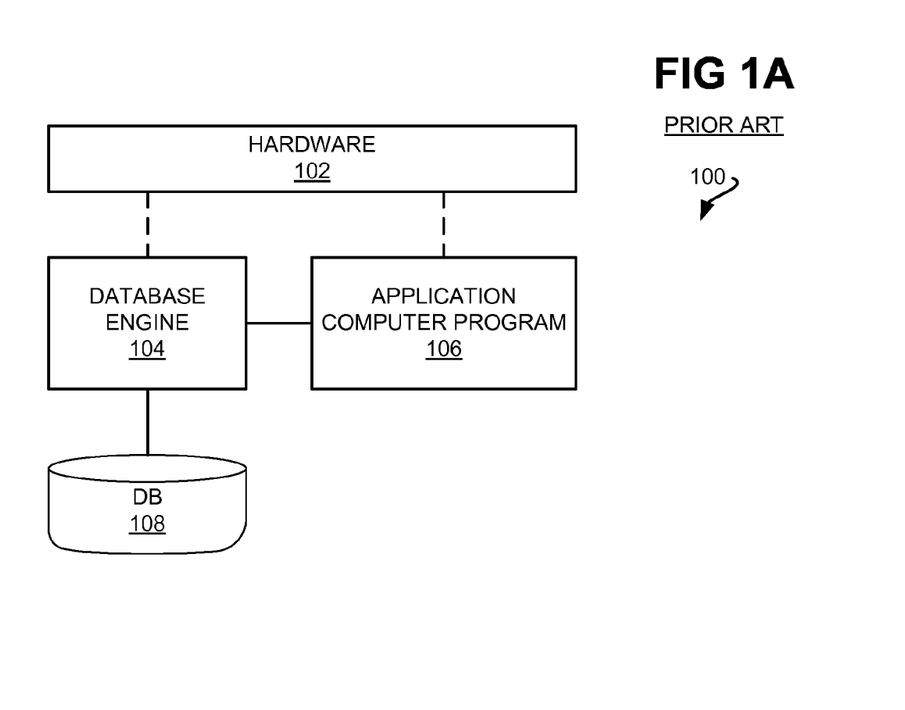
FIG. 1A is a diagram of a computing system, according to the prior art.
Figure 1B:
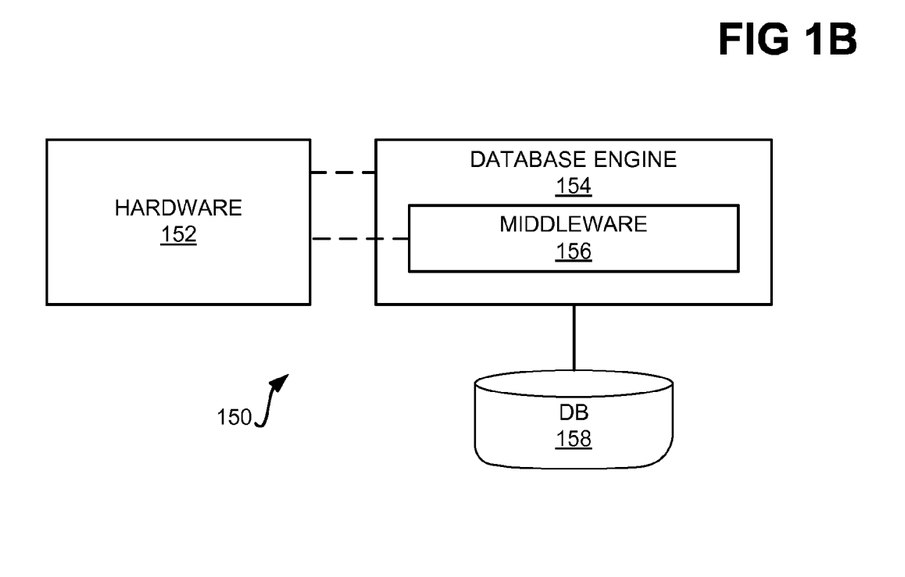
FIG. 1B is a diagram of a computing system, according to an embodiment of the present disclosure.

FIG. 1A shows a computing system 100, according to the prior art, whereas FIG. 1B shows a computing system 150, according to an embodiment of the disclosure. In FIG. 1A, the computing system 100 includes hardware 102, a database engine 104, an application computer program 106, and a database 108. In FIG. 1B, the computing system 150 includes hardware 152, a database engine 154, middleware 156, and a database 158.

The hardware 102 and 152 can be or include one or more processors, memory, storage devices like hard disk drives, and so on. The computing systems 100 and 150 may be implemented over one or more computing devices. In FIG. 1A, the database engine 104 and the application computer program 106 are executed by or using the hardware 102, and thus are said to be implemented by the hardware 102. Likewise, in FIG. 1B, the database engine 104 and the middleware 156 are executed by or using the hardware 152, and thus are said to be implemented by the hardware 152.

In the computing system 100 of FIG. 1A, the application computer program 106 processes a dataflow graph by issuing queries of the dataflow graph to the database engine 104, which evaluates the queries against the database 108. As noted above, duplicate queries are evaluated or executed individually by the database engine 104, which hampers performance. Furthermore, the bandwidth between the application computer program 106 and the database engine 104 may be limited, such that a limited amount of data may be able to be transferred between the program 106 and the engine 104 at any given time, which also hampers performance.

By comparison, in the computing system 150 of FIG. 1B, the middleware 156 is integrated within the database engine 154, and interacts with the database engine 154 to cause the database engine to execute or evaluate the queries of a dataflow graph. Duplicate queries are not evaluated or executed multiple times; rather, if a query is identical to a previously evaluated query, the results can be reused to improve performance. Furthermore, there are lesser bandwidth limitations between the middleware 156 and the database engine 154, since the former is integrated within the latter, which also improves performance.

Figure 2:
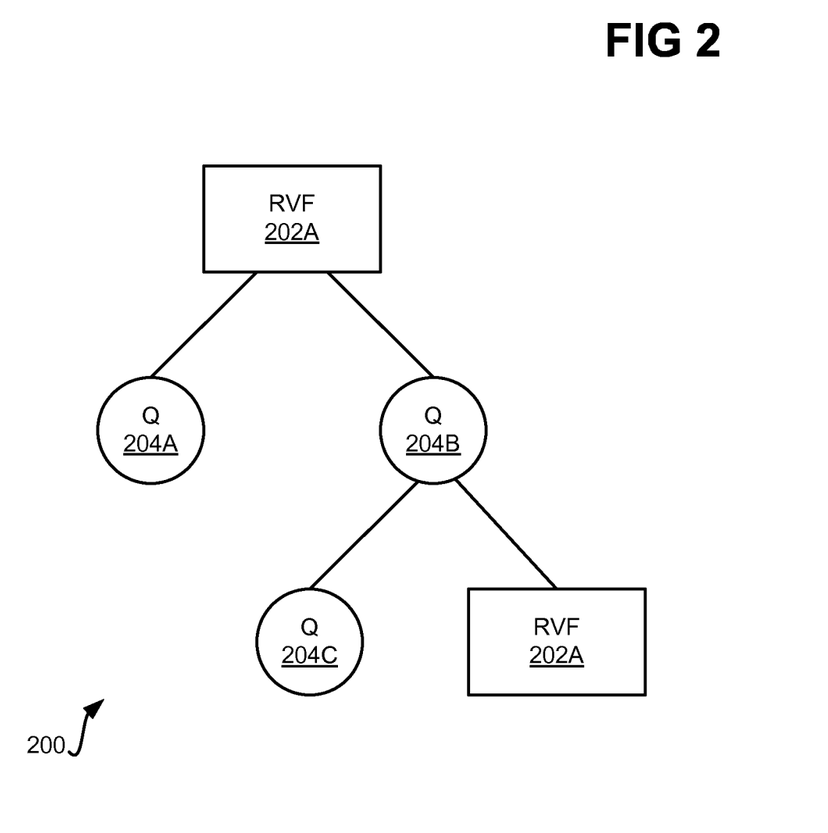
FIG. 2 is a diagram of an example dataflow graph to explain relation valued functions, according to an embodiment of the present disclosure.
Figure 3:
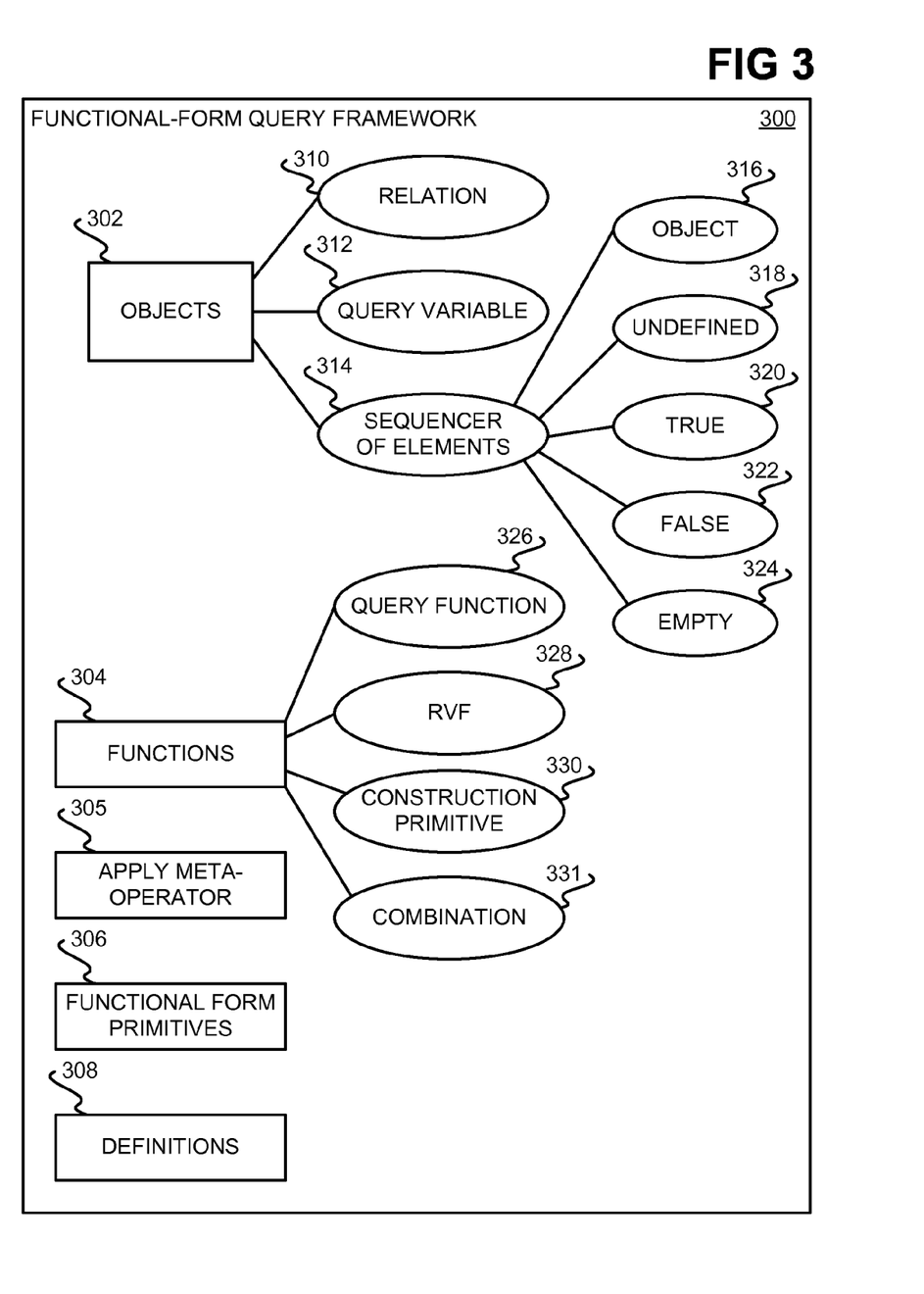
FIG. 3 is a diagram of a functional-form query framework, according to an embodiment of the present disclosure.

Dataflow graph processing by the application computer program 106 in FIG. 1A is thus replaced by dataflow graph processing by the middleware 156 in FIG. 1B. However, integrating the functionality of dataflow graph processing is not as simple as just replacing the application computer program 106 with the middleware 156. Rather, certain modifications are made. In particular, as noted above, the dataflow graph is represented as a functional-form query expressed within a functional-form query framework, and the dataflow graph includes relation valued functions as well as queries, as is now described in detail in relation to FIGS. 2 and 3. FIG. 2 is presented to explain what relation valued functions are, whereas FIG. 3 is presented to explain an exemplary functional-form query framework.

FIG. 2 shows an example of such a dataflow graph 200, according to an embodiment of the disclosure. The example dataflow graph 200 includes a number of relation valued functions 202A and 202B, collectively referred to as the relation valued functions 202, and a number of queries 204A, 204B, and 204C, collectively referred to as the queries 204. The example dataflow graph 200 is specifically in the form of a tree.

The relation valued functions 202 are each user-defined functions that have been extended in the following way. To handle operations applied to a set of tuples (i.e., a set of relations) rather than a single tuple, conventional scalar, aggregate, and table user-defined functions are extended to permit relation input and output. A relation valued function thus receives as input a list of relations, and returns as output another relation. In one embodiment, a relation can be considered as a list of attribute name-type pairs, as well as any optional constraints, indices, and so on that are needed to define the attribute names and the types of the pairs. An attribute in this context is a parameter or a variable, which has a particular name, and a particular type, which may be string, integer, real number, or another type.

For example, a relation valued function can be defined as follows:

```
DEFINE RVF f(x, y, R1, R2) RETURN R3 {
    Float x, y;
    Relation R1 (/* schema1 */);
    Relation R2 (/* schema2 */);
    Relation R3 (/* schema3 */);
    PROCEDURE fn(/*function name */);
    RETURN MODE SET_MODE;
}
```

In this example, the relations R1, R2, and R3 are defined by schemas schema1, schema2, and schema3, respectively, and denote the scheme of the relation valued function f. Actual relation instances or query results compliant to these schemas can be bound to f as parameters. The input variables x and y can be bound to the attribute values of a tuple in tuple-wise query processing. However, the relations R1 and R2 are passed during the first call of the function f in processing the query that invokes this relation valued function. The returned set of tuples can be returned all at once, or tuple by tuple.

A relation valued function has at least one input relation, but does not update its input relations. Rather, a relation valued function generates a new relation as its output, and in this way is treated as a relational operator or a data source. Extending user-defined functions as relation valued functions thus has certain advantages. First, a relation valued function can model general operations; because a relation valued function can operate on a set of tuples (i.e., a set of relations), it can accommodate more general operations that cannot be defined on a single tuple (i.e., a single relation).

Second, a relation valued function can compose operations with queries and integrate the invocation of the queries during processing. For example, in the example dataflow graph 200 of FIG. 2, the relation valued function 202A is composed of queries 204A and 204B. The query 204B itself is dependent upon the results of the query 204C and upon the results of the relation valued function 202B. Relation valued functions can thus be naturally composed with other relational operators within an SQL query. More specifically, the dataflow graph 200 of FIG. 2 represents the SELECT*FROM RFV1(Q1, Q2(Q3, RVF2)). In general, a given relation valued function f applied to a given relation R can itself be expressed as the query SELECT*FROM f("SELECT*FROM R").

Using relation valued functions provides for performance benefits, because applying a function a set of tuples, instead of tuple-by-tuple, can avoid repeatedly loading the data needed for processing each tuple. Furthermore, this permits the functions to be processes on a batch or parallel basis using multiple-core processors, or massively parallel processing accelerators. Fundamentally, relation valued functions provide the mechanism by which complex operations can be wrapped and integrated within SQL and other types of queries.

FIG. 3 shows a functional-form query framework 300, according to an embodiment of the disclosure. The functional-form query framework 300 is utilized to formulate functional-form queries that can be evaluated by the middleware 156 integrated within the database engine 154 of FIG. 1B. Functional-form queries are a mechanism that permits the middleware 156 to be integrated within the database engine 154 in FIG. 1B, as opposed to having an application computer program 106 external to the database engine 104, as in the prior art of FIG. 1A.

A functional-form query framework is a framework of queries that employs a functional form, which means a function-combining form. That is, a functional form is an expression that denotes the function; the function depends on the functions which are the parameters of the expression. A functional form query is thus a query that includes an expression denoting a function based on other functions that are parameters within the expression. For example, if f and g are relation valued functions, then f·g is a functional form that denotes a new function, such that, for a relation r, f(f·g):r=f:(g:r), provided that the relation r matches the input schema of the function g, and g:r matches the input schema of the function f.

A functional-form query framework uses a fixed set of functional forms for combining query functions, where a query can invoke relation valued functions. These functional forms, plus additional definitions, provide the mechanism by which new functions can be constructed from existing ones. Such new functions do not use variables or substitution rules, and become the operations of an associated algebra of queries. The functions of the functional-form query framework are of the same type, mapping relations into relations, and are the operands of the functional forms.

The functional-form query framework 300 includes a set O of objects 302, a set F of functions 304, an apply meta-operator 305, a set C of functional form primitives 306, and a set D of definitions 308. Each object of the set O of objects 302 is a relation 310, a query variable 312, or a sequence of elements 314. Each function of the set F of functions 304 is a query function 326, a relation valued function 328, or a construction primitive 330. In one embodiment, a function of the set F of functions 304 may be a combination 331 of one or more of a query function 326, a relation valued function 328, and a construction primitive 330 as well.

The set O of objects 302 has a relation 310. A query variable 312 is a query that is bound to one or more specific relations. For example, the query SELECT*FROM Sales, Customers
WHERE Sales.customer_id=Customers.id;

is bound to the actual relations Sales and Customers. A query variable can be viewed as a relation data object that denotes the result of the query. With respect to a sequence of elements 314, each element of the sequence is itself an object 316; undefined, as indicated by reference number 318; a logical value of true, as indicated by reference number 320; a logical value of false, as indicated by reference number 322; or an empty element 324.

With respect to the set F of functions 304, a query function 326 is a function that is applied to a sequence of relations. For example, the query SELECT*FROM Sales, Customers
WHERE Sales.customer_id=Customers.id;

has the corresponding query function fQ:=SELECT*FROM $1, $2 WHERE $1.customer_id=$2.id;

In this query function, $1 represents the first element of a sequence, $2 represents the second element of the sequence, and $k, for instance, represents the k-th element of the sequence. Applying the query function fQ to a sequence of relations <Sales, Customers> with associated schemas is expressed as:

fQ:<Sales, Customers>→vQ

One constraint of query functions is schema preservation, which is that the schemas of the relations match the query function. As such, a query function may not be applicable to arbitrary relations.

A relation valued function 328 is a user-defined function that has been extended to permit relation input and output, in that a list of relation is received as input, and another relation is returned as output, as has been described above. The query function 326 and the relation valued function 328 are both schema aware. That is, insofar as the query function 326 and the relation valued function 328 are applied to a relation, they are defined according to the schema of the relation, such that they are schema aware.

A construction primitive 330 defines how a function is applied to one or more variables, including in which order the function is applied to the variables. Examples of construction primitives 330 include selector, identity, constant, and union primitives. The selector primitive selects an element from a sequence of elements, and can be expressed as $i:<r1, ..., rn>, such that the i-th element ri is selected from the sequence of elements <r1, ..., rn>. The identity primitive specifies that an element is equal to itself, and can be expressed as id:r=r. The constant primitive defines the name of one element for another element, and can be expressed as !y:x=y, such that x can be specified as y in addition to being specified as x. The union primitive constructs the union of two elements, and can be expressed as <r1, r2>, which means r1∪r2. A combination 331, as noted above, is a combination of one or more of a query function 326, a relation valued function 328, and a construction primitive 330.

The apply meta-operator 305 applies a function f to an object r. This is expressed as f:r. The apply meta-operator 305 may also apply a function f to a sequence of objects <r1, ..., rn>. This is expressed as f:<r1, ..., rn>.

The set C of functional form primitives 306 combine existing functions to create new functions, whereas the definitions 308 define these existing functions; that is, the definitions 308 define the base preexisting set F of functions 304, and can assign a name to each for convenience. As noted above, a function form is an expression denoting a function. A functional form can be used to combine queries with relation valued functions into higher-level functions for expressing dataflow graphs, which conventional SQL cannot do. Examples of functional form primitives include composition, construction, condition, map, and reduce primitives.

The composition primitive composes a new function from two existing functions. The composition primitive can be expressed as f·g:r=f:(g:r), for two functions f and g and a relation r. The construction primitive composes a new function as a series of existing functions. The construction primitive can be expressed as [f1 ... fn]:r=<f1:r ... fn:r>, for n functions f and a relation r. The condition primitive indicates one of two functions being performed based on a given condition. The condition primitive can be expressed as (p→f, g):r=((p:r)=T→f:r; g:r), for two functions f and, and a relation r, where p denotes the primitive itself. Thus, if p:r is true, then f:r is performed, and otherwise g:r is performed (i.e., if p:r is false).

The map primitive can also be considered an apply-to-all primitive, which applies a given function to a set of relations. The map primitive can be expressed as αf: <r1 ... rn>=<f: r1 ... f:rn>, which maps, or applies, the function f to n relations r. The reduce primitive (recursively) converts a sequence of values to a single value. The reduce primitive can be expressed as /f:r=r=<r1>→r1; r=<r1 ... rn> & n>=2→f:r1, /f: <r2 ... rn>>, for a function f and n relations r. For example, /+:<1,2,3> returns the sum 6, since 1+2+3=6—the addition operator "+" is performed on all the values 1, 2, and 3.

The reduce primitive can be generally used for stepwise merging and aggregation purposes. It is also noted that functional form primitives have certain algebraic properties, such as:

[f·Qf,g·Qf]=[f,g]·Qf where f and g are functions, and Qf is a query function.

In the functional-form query framework 300, functions can be defined level by level from query functions and relation valued functions in terms of functional form primitives. Application of a functional form primitive to a number of functions denotes a new function, and application of the resulting new function to a number of relations denotes a functional-form structure SQL query. A functional form SQL query can specify a dataflow graph, which a conventional SQL query cannot do. That is, conventional SQL queries represent tree-structure dataflows, whereas functional form SQL queries can also represent graph-structured dataflows.

Figure 4A:
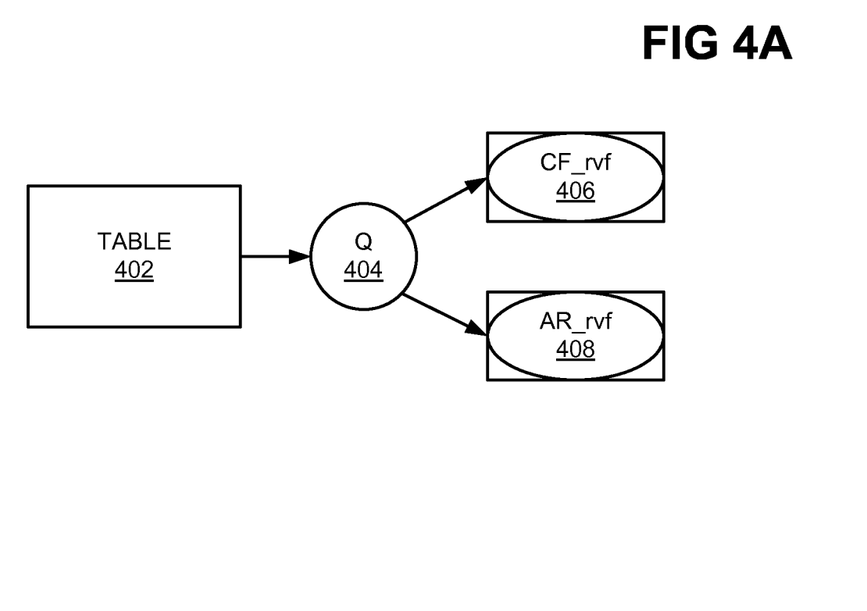
FIGS. 4A and 4B are diagrams of example dataflow graphs that are expressible as functional-form queries within a functional-form query framework, according to different embodiments of the present disclosure.
Figure 4B:
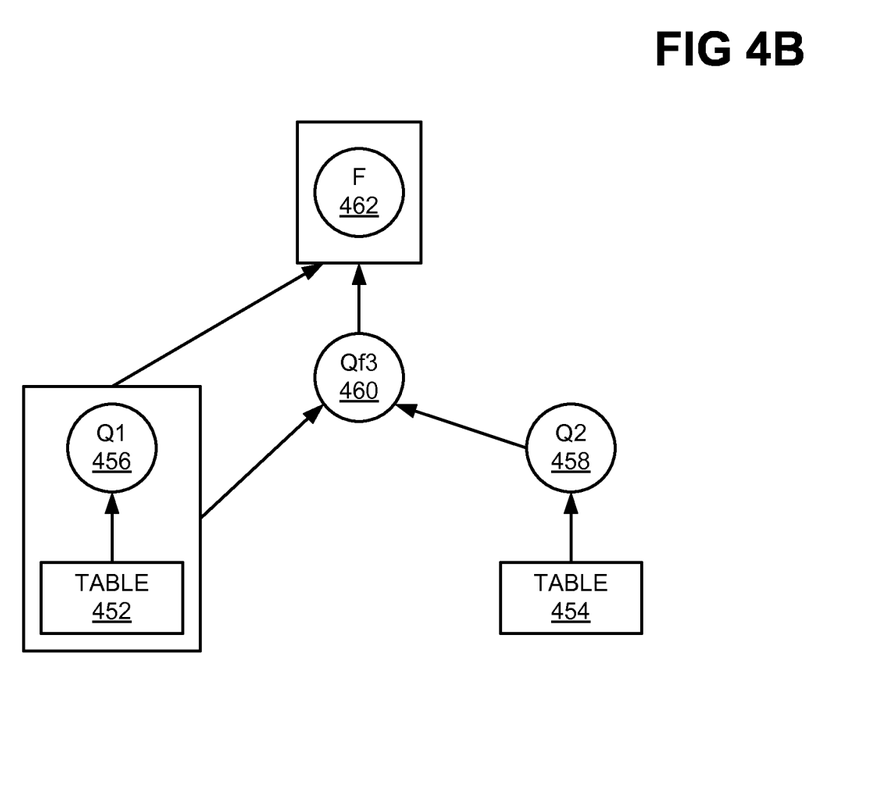

Two examples of utilization of a functional-form query framework to formulate a functional-form query so that the middleware 156 integrated within the database engine 154 in FIG. 1B is able to evaluate the query are now described in relation to FIGS. 4A and 4B. FIG. 4A shows an example dataflow graph in which a query result uses a fork, according to an embodiment of the disclosure. FIG. 4B shows an example dataflow graph in which query results are shared, according to an embodiment of the disclosure.

In FIG. 4A, a table 402 that stores shopping transaction data is retrieved and filtered by a query Q 404. The result of query Q 404 is delivered to two relation valued functions: CF_rvf 406, which may generate a collaborative filtering matrix as one example, and AR_rvf 408, which may generate association rules as one example. Using a functional-form query framework permits the dataflow of FIG. 4A to be forked without duplicate database retrieval. That is, forking the dataflow in FIG. 4A is expressible using a functional-form query framework, as follows.

First, the query Q 404 can be expressed as a query variable:
Q=SELECT tx-id, product, customer, month, store
FROM shopping_transactions;
Next, the relation valued functions 406 and 408 can be expressed as relation valued functions as follows:
AR_rvf(Q)—Cross_selling_association_rules;
CR_rvf(Q)—Collaborative_filter_customer_behavior;
Therefore, the functional-form SQL query representing the dataflow of FIG. 4A is expressed simply as [AR_rvf, CF_rvf]: Q.

In FIG. 4B, a table 452 stores networking traffic by networking address, and a table 454 stores which users by their networking addresses. A query Q1 456 measures networking traffic on a networking address-to-networking address basis, and a query Q2 458 determines which networking addresses are associated with which users. The results of the queries 456 and 458 are input into a query function Qf3 460, which measures networking traffic on a user-to-user basis. Finally, the relation valued function F 462 receives as input the results of the query Q1 456 and the results of the query function Qf3 460, to analyze user behavior within the networking traffic. Using a functional-form query framework permits the dataflow of FIG. 4B to reuse the results of the query Q1 456 without duplicating evaluation of this query.

First, the queries Q1 456 and Q2 458 can be expressed as query variables:
Q1=SELECT from-ip, to-ip, SUM(bytes) AS bytes
FROM Traffic_Table WHERE . . . /*time range*/
GROUP by from-ip, to-ip;
Q2=SELECT id, name, organization, category, security_level
FROM Users Table;
The query function Qf3 460 is then expressed as follows:
Qf3:=SELECT u1.user-id AS from-user, u2.user-id
AS to-user, t.bytes FROM $1 t, $2 u1, $2 u2
WHERE u1.ip=t.from-ip AND u2.ip=t.to-ip
Therefore, the functional-form SQL query representing the dataflow of FIG. 4B is expressed simply as F·[$1,Qf3]:<Q1, Q2>.

Thus far in the detailed description, middleware that is integrated within a database engine has been functionally described insofar as the middleware evaluates functional-form queries that include relation valued functions and that are expressed within a functional-form query framework. Two examples of functional-form queries that are expressed within a functional-form query framework have been presented. Next, additional details as to how such middleware can be implemented in conjunction with an existing database engine are described. Thereafter, the detailed description is concluded with the presentation of a method.

Figure 5:
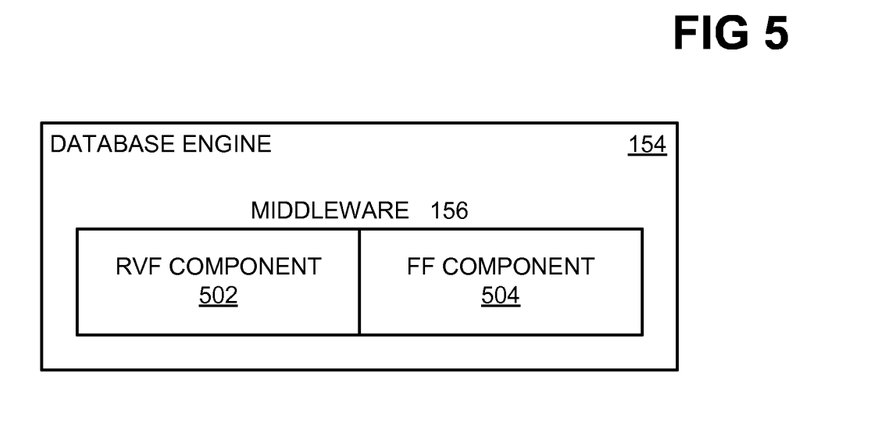
FIG. 5 is a diagram of middleware integrated within a database engine, according to an embodiment of the present disclosure.

FIG. 5 shows in more detail the middleware 156 as integrated within the database engine 154, according to an embodiment of the disclosure. The middleware 156 includes a relation valued function component 502 and a functional-form component 504. In one embodiment, the database engine 154 is the PostgreSQL database engine, which is available on the Internet at www.postgresql.org.

The relation valued function component 502 extends the functionality of the database engine 154 to support relation valued functions, so that business intelligence and other types of applications that are expressible via one or more relation valued functions within a dataflow graph can be evaluated by the database engine 154. A relation valued function is invoked as a query. For example, a relation valued function, such as f(R), can be represented as the query SELECT*FROM f(r). Therefore, the relation valued function component 502 is able to translate relation valued functions into queries that the database engine 154 can evaluate.

The functional-form component 504 extends the functionality of the database engine 154 to support functional-form queries that express dataflow graphs. A functional-form query invokes queries during its execution. The functional-form component 504 therefore passes such queries to the database engine 154 for evaluation. The functional-form component 504 also passes relation valued functions to the relation valued function component 502 for translation into queries that are then evaluated by the database engine 154 for evaluation.

In some types of database engines, such as the PostgreSQL database engine, the result of an execution (i.e., evaluation) of a query is stored within a section of memory for the query that is referred to as a memory context. The memory context of a query is accessible to other invoked queries, which permits sharing of the results of the query. For example, if a first query is duplicative a second query, just the first query is evaluated, and not the second query. The results of the first query are not copied to the memory context of the second query, but rather the second query uses the results of the first query by reference to the first memory context.

The functional-form component 504 is said to be able to evaluate queries in parallel insofar as a given functional-form query (i.e., representing a corresponding dataflow graph) encompassing these queries permits these queries to be evaluated in parallel. Evaluation in this context means that the functional-form component 504 is able to pass multiple queries to the database engine 154 for evaluation in a parallel manner. A functional-form query permits its queries to be evaluated in parallel based on the control implicit within the functional-form query.

For example, in the functional-form query f·g:x=f(g:x), the query functions f and g are execute in a right-to-left order, such that the query function g is first evaluated against the parameter x, and then the query function f is evaluated against the results of the query function g as has been evaluated against the parameter x. By comparison, in the functional-form query [f1 . . . fn]: x=<f1:x . . . fn:x>, the query functions f1 . . . fn can be executed in parallel against the parameter x. In the functional-form query p→f, g:x=((p:x)=T→f:x; g:x), first the query function p is evaluated against the parameter x, and thereafter the query functions f and g can be evaluated in parallel against the parameter x. As a final example, in the functional-form query αf:<x1 . . . xn>=<f:x1 . . . f:xn>, the query function x can be evaluated against the parameters x . . . xn in parallel.

The functional-form component 504 is also able to provide for dataflow during evaluation of a functional-form query by passing references to objects of the functional-form query, without having to duplicate the objects, as follows. A data object R flowing through a query or a relation valued function means that the query or the relation valued function generates an output relation from the data object R. Where the data object R flows through a construction primitive G, such as id or $1, this means that the data object R is to remain referenced through evaluation of the query or relation valued function in question. Maintaining reference to the data object R during evaluation therefore ensures that the data object R is not copied.

In these ways, then, a database engine 154 can have its functionality extended via the middleware 156 to support relation valued functions and functional-form queries, where the latter represent dataflow graphs. The functional-form component 504 of the middleware 156 supports functional-form queries, by parsing such functional-form queries into their constituent relation valued functions and non-functional-form queries. The non-functional-form queries are passed by the functional-form component 504 to the database engine 154 for evaluation. The relation valued functions are passed by the functional-form component 504 to the relation valued function component 502, for parsing into (non-functional-form) queries that are then passed to the database engine 154 for evaluation.

Figure 6:
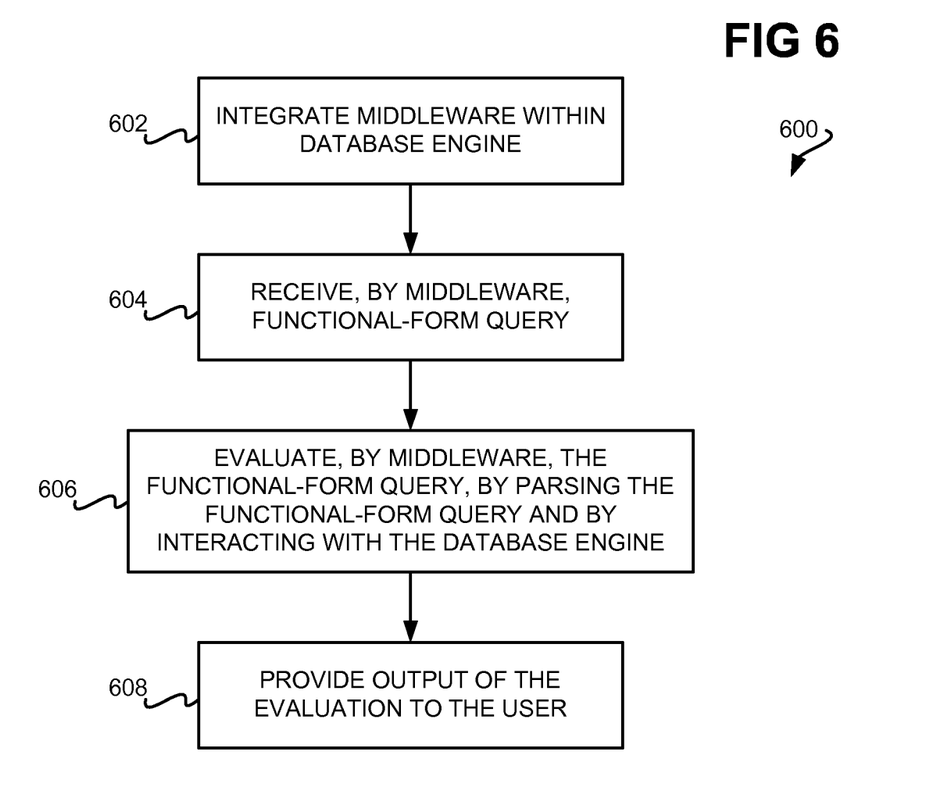
FIG. 6 is a flowchart of a method, according to an embodiment of the present disclosure.

In conclusion, FIG. 6 shows a method 600, according to an embodiment of the disclosure. The method 600 may be implemented as one or more computer programs stored on a computer-readable storage medium. Examples of computer-readable storage media include volatile media, such as dynamic random access memory, and non-volatile media, such as hard disk drives and solid-state drives. The computer programs are executable by one or more processors of one or more computing devices to cause the method 600 to be performed.

First, middleware 156 is integrated within a database engine 154 (602), as has been described. The middleware 156 then receives a functional-form query representing a dataflow graph include queries and relation valued functions (604), which the middleware 156 evaluates by interacting with the database engine 154 (606), as has been described. Evaluation of the functional-form query results in output, which is provided to the user (608). For example, the output may be displayed on a display device to a user, communicated over a network, stored on a storage device, and so on.

It is noted that the dataflow graphs represented by functional-form queries in embodiments of the present disclosure differ from dataflow graphs that are represented by conventional SQL queries. The dataflow graph that is represented by a conventional SQL query can only be a tree, which is typically referred to as a query tree. The processing results of a given node of a query tree can thus be passed back to just one parent or root node, since a given node within a tree has just one parent or root node. That is, a tree dataflow graph is such that each node can have at most one parent or root node, and not multiple parent or root nodes. By comparison, the dataflow graph that is represented by a functional-form query in accordance with an embodiment of the present disclosure can be a graph other than a tree. As such, the processing results of a given node of a dataflow graph can be passed back to more than one more parent or root node, since a given node within a dataflow graph other than a tree can have more than one parent or root node. In this way, functional-form queries are more powerful than conventional SQL queries, because they can represent dataflow graphs other than trees.

Furthermore, the functional-form queries can support unlimited recursion within the dataflow graphs that they represent. In particular, the recursion that is supported by functional-form queries is inter-operator recursion, in which the results of one type of operator are recursively provided to another type of operator. By comparison, conventional SQL queries support only a limited kind of recursion, and not inter-operator recursion in particular. More specifically, the kind of recursion that can be expressed within conventional SQL queries is the application of the same operator (not different operators) to the earlier processing result of this operator. For example, a conventional SQL query may recursively locate an employee's manager, then the manager of the employee's manager, then the manager of the manager of the employee's manager, and so on. In this type of recursion, the same operator—locate an individual's manager—is utilized.

By comparison, for example, a functional-form query may recursively locate an employee's manager, then the manager's administrator, then this administrator's backup administrator, then the manager of this backup administrator, and so on. In this type of recursion, two operators—locate an individual's manager and locate an individual's backup—are utilized. In this way, functional-form queries are more powerful than conventional SQL queries, because they can provide for inter-operator recursion.

We claim:
1. A computing system comprising:
hardware;
a database engine implemented by the hardware; and,
middleware integrated within the database engine and implemented by the hardware to execute a functional-form query representing a dataflow graph comprising a plurality of queries and a plurality of relation valued functions,
wherein the middleware is to interact with the database engine to cause the database engine to execute the queries, and
wherein each relation valued function receives a plurality of first relations as input and generates a second relation as output.

2. The computing system of claim 1, wherein the dataflow graph is a non-tree dataflow graph.

3. The computing system of claim 1, wherein each first relation and the second relation of each relation valued function is defined as a schema.

4. The computing system of claim 1, wherein each relation valued function further receives one or more variables as input.

5. The computing system of claim 1, wherein each relation valued function defines a function to generate the second relation from the first relations.

6. The computing system of claim 1, wherein the functional-form query is a query that includes an expression denoting a function based on other functions that are parameters within the expression.

7. The computing system of claim 1, wherein the functional-form query is expressed within a functional-form query framework comprising a plurality of objects, each object comprising one of a relation, a query variable, and a sequence of elements,
and wherein a query variable is a query that is bound to one or more specific relations.

8. The computing system of claim 7, wherein each element comprises one of an object, an undefined element, a logical value of true, a logical value of false, and an empty element.

9. The computing system of claim 7, wherein the functional-form query framework further comprises a plurality of functions, each function mapping one of the objects to another of the objects, each function being one of a query function, a relation valued function, a construct primitive, and a combination of one or more of a query function, a relation valued function, and a construction primitive,
wherein a query function is applied to a sequence of relations,
and wherein a construction primitive defines how a function is applied to one or more variables.

10. The computing system of claim 9, wherein the functional-form query framework further comprises:
an apply meta-operator to apply a function to an object;
a set of functional form primitives to combine existing functions to create new functions; and,
a set of definitions that define the existing functions.

11. The computing system of claim 1, wherein the middleware comprises a first component to extend functionality of the database engine to support the relation valued functions to integrate applications into the queries that are evaluated by the database engine.

12. The computing system of claim 11, wherein the middleware comprises a second component to extend functionality of the database engine to support the functional-form query that expresses the dataflow graph.

13. The computing system of claim 12, wherein the second component is to store results of execution of the queries by the database engine within memory contexts of the queries, such that results of a first query is stored within a memory context of the first query, and such that a second query that is a duplicate of a first query uses the results of the first query by reference to the memory context.

14. The computing system of claim 12, wherein where the functional-form query permits the queries to be evaluated in parallel, the second component is to evaluate the queries in parallel.

15. The computing system of claim 12, wherein the second component is to provide for dataflow during evaluation of the functional-form query by passing references to objects of the functional-form query without duplicating the objects.

16. A method comprising:
receiving, by middleware integrated within a database engine and as executed by a processor, a functional-form query representing a dataflow graph comprising a plurality of queries and a plurality of relation valued functions; and,
evaluating, by the middleware as executed by the processor, the functional-form query, by interacting with the database engine to cause the database engine to execute the queries,
wherein each relation valued function receives a plurality of first relations as input and generates a second relation as output.

17. The method of claim 16, wherein evaluation of the functional-form query results in output, and wherein the method further comprises providing the output to a user.

18. The method of claim 16, wherein the functional-form query is a query that includes an expression denoting a function based on other functions that are parameters within the expression.

19. The method of claim 16, wherein the functional-form query is expressed within a functional-form query framework comprising:
a plurality of objects, each object comprising one of a relation, a query variable, and a sequence of elements, where a query variable is a query that is bound to one or more specific relations;
a plurality of functions, each function mapping one of the objects to another of the objects, each function being one of a query function, a relation valued function, a construct primitive, and a combination of one or more of a query function, a relation valued function, and a construction primitive;
an apply meta-operator to apply a function to an object;
a set of functional form primitives to combine existing functions to create new functions; and,
a set of definitions that define the existing functions,
wherein a query function is a function that is applied to a sequence of relations,
and wherein a construction primitive defines how a function is applied to one or more variables.

20. A non-transitory computer-readable storage medium having a computer program for execution by a processor, wherein execution of the computer program by the processor results in a method being performed, the method comprising:
integrating middleware within a database engine, the middleware to execute a functional-form query representing a dataflow graph comprising a plurality of queries and a plurality of relation valued functions,
wherein the middleware is to interact with the database engine to cause the database engine to execute the queries, and
wherein each relation valued function receives a plurality of first relations as input and generates a second relation as output.

* * * * *